Sept. 29, 1953  A. C. MUELLER  2,653,528
PHOTOGRAPHIC AND VIEW FINDER LENS TURRET
COUPLING FOR PHOTOGRAPHIC CAMERAS
Filed June 30, 1952 2 Sheets-Sheet 1
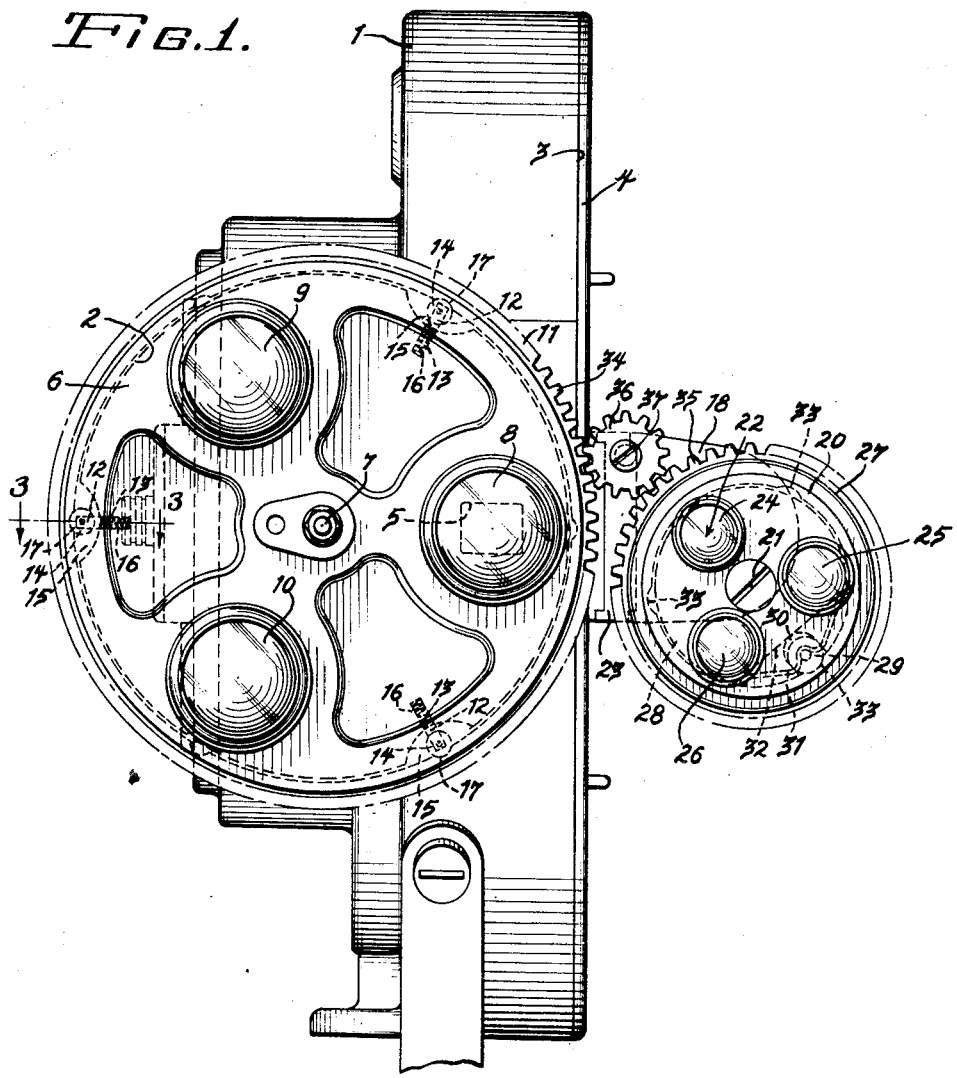
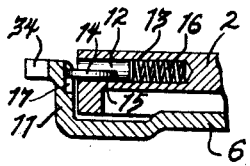
INVENTOR.
ARTHUR C. MUELLER
BY
Robert F. Miehle, Jr.
ATTY.

Patented Sept. 29, 1953

2,653,528

UNITED STATES PATENT OFFICE 2,653,528

PHOTOGRAPHIC AND VIEW FINDER LENS TURRET COUPLING FOR PHOTOGRAPHIC CAMERAS

Arthur C. Mueller, Des Plaines, Ill., assignor to Bell & Howell Company, Chicago, Ill., a corporation of Illinois Application June 30, 1952, Serial No. 296,407

11 Claims. (Cl. 95—44)

My invention relates particularly to a photographic camera which is equipped with laterally adjacent rotatable photographic and view finder lens turrets respectively of large and small diameters and respectively carrying different large photographic and respectively corresponding small view finder lenses arranged in corresponding angularly spaced relation about the axes of the turrets, for selectively simultaneously positioning each photographic lens and its corresponding view finder lens in their functioning positions, and relates more particularly to such a camera on which the photographic lens turret is mounted on the camera casing and the view finder and its view finder lens turret is carried on a door of the camera which is releasably secured on the camera casing in position closing a side access opening of the casing. Where the photographic and view finder lens turrets are independently rotatable, each must be separately rotated to position a selected photographic lens and its corresponding view finder lens in their functioning positions, and if the operator neglects to correspondingly position both turrets, he will view through a view finder lens which does not correspond with the functioning photographic lens with resulting variation between the scene which he views and that which is photographed.

Objects of the invention reside in the provision of a simple, reliable, compact, unobtrusive and convenient drive connection between the aforesaid photographic and view finder lens turrets; which assures that when a selected photographic lens is in photographing position, its corresponding view finder lens is in view finding position; which requires manipulation of only one of the turrets and permits manipulation of either turret; which provides for accurate selective positioning of the photographic and view finder lenses in their functioning positions without necessitating a precision drive connection between the turrets; which permits of variation between the spacing of the turrets with only minor alteration; and which when the view finder and its lens turret are mounted on the camera door as aforesaid, permits of movement of the door out of and into position closing the access opening of the camera casing.

The invention will be better understood by reference to the accompanying drawing forming a part hereof and in which—

Figure 1 is a front elevation of a motion picture camera embodying my invention;

Figure 3 is a partial sectional view taken substantially on the line 3—3 of Figure 1.

Figure 2:
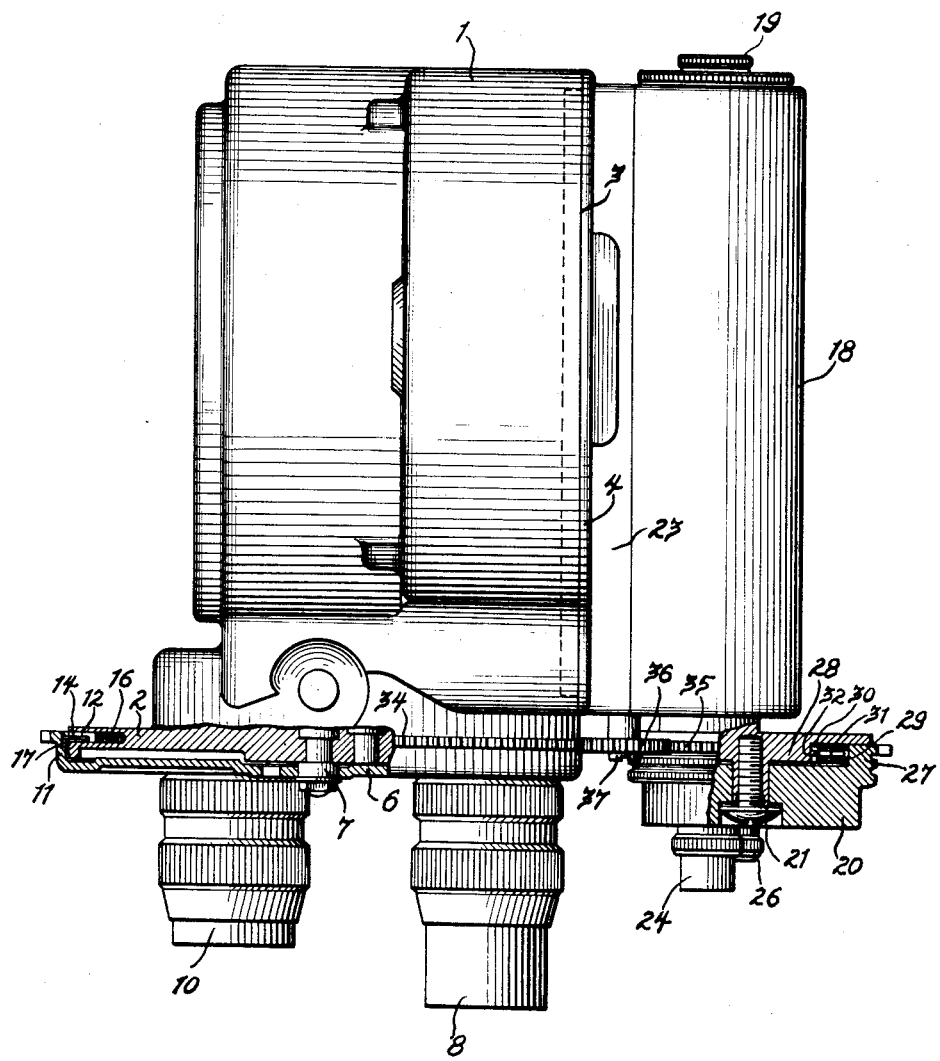
Figure 2 is a top plan view of the same with parts broken away and shown in section.

Referring to the drawing, 1 designates a motion picture camera casing in which the mechanism of the camera is disposed, and which is provided with a circular front 2 and an access opening 3 at one side thereof for the insertion of film in and the removal of the same from the casing. A door 4 is releasably secured, in a usual manner not shown, on the casing in position closing the access opening 3.

The optical axis of the camera, as indicated by the exposure aperture 5 in Figure 1, is spaced horizontally from the axis of the circular front 2 of the casing and is disposed adjacent the access opening. A photographic lens turret 6 of a relatively large diameter slightly greater than that of the front 2, is rotatably mounted, as designated at 7, on and immediately in front of the circular front 2 in concentric relation therewith, and having its axis disposed in parallelism with the optical axis of the camera, extends across the same.

Three photographic lenses 8, 9 and 10 of different optical characteristics, are mounted on the turret 6 in equal angularly spaced relation about the axis of the turret, and are adapted to be selectively registered with the optical axis of the camera with angular movement of the turret for selectively photographing through the different lenses, the lens 8 being shown in registry with the optical axis of the camera.

The turret 6 is provided with a rearwardly projecting peripheral flange 11 which surrounds the front 2, and three studs 12 are slidably engaged in radial bores 13 in the front 2 and disposed in equal angularly spaced relation about the turret axis, see Figures 1 and 3, and detent rollers 14 are engaged in peripheral recesses 15 of the front 2 and are rotatably mounted on the outer ends of the studs 12 for rolling engagement outwardly against the turret flange 11. Springs 16 within the bores 13 yieldably urge the studs 12 and rollers 14 outwardly toward the turret flange, and the turret flange is provided with three inwardly facing cam depressions 17 arranged in equal angularly spaced relation about the turret axis and into which the rollers 14 engage under the influence of the springs 16 to precisely releasably detain the turret 6 in positions in each of which a selected photographic lens is in photographing position registering with the optical axis of the camera, it being noted that these spring and cam detent devices serve also to actuate the turret 6 angularly a limited extent for registering each photographic lens in photographing position.

A view finder is mounted on the exterior of the door 4 and is disposed in adjacent parallelism with the optical axis of the camera when the door is secured on the camera casing as aforesaid. The view finder comprises a tubular body 18, an eye piece 19 at the rear end of the tubular body, and a view finder lens turret 20 of relatively small diameter rotatably mounted forwardly on the tubular body, as designated at 21, and having its axis disposed in parallelism with the optical axis 22 of the view finder, extends across the same.

The view finder is carried on the exterior of the camera door 4 by a suitable mounting preferably comprising an interchangeable spacing block 23 laterally interposed between the view finder body 18 and the door so that the view finder may be spaced at different distances from the camera door and consequently from the camera casing 1 to meet different conditions by employing a spacing block of the required thickness.

Three view finder lenses 24, 25 and 26 of different optical characteristics respectively corresponding with those of the photographic lenses 8, 9 and 10, are mounted on the view finder lens turret 20 in equal angularly spaced relation about the axis of this turret, and are adapted to be selectively registered with the optical axis 22 of the view finder with angular movement of this turret for selectively viewing through the different view finder lenses, the view finder lens 24 which corresponds with the photographic lens 8, being shown in registry with the optical axis of the view finder simultaneously with the registration of the photographic lens 8 with the optical axis of the camera. Likewise, the photographic lenses 9 and 10 and their respectively corresponding view finder lenses 25 and 26 are selectively simultaneously registerable respectively with the optical axes of the camera and view finder.

The view finder lens turret 20 is provided with a rearwardly projecting peripheral flange 27 which surrounds a circular front portion 28 of the tubular view finder body 18, this circular portion being concentric with the axis of the turret 20. See Figures 1 and 2. A grooved detent roller 29 is slidably and rotatably engaged in a radial slot 30 in the portion 28, and a bow spring 31 is arranged in a tangential recess 32 in the portion 28 and has its intermediate portion engaged with the slotted portion of the detent roller and has its end portions engaged with the bottom of the recess 32 and yieldably urges the roller 29 outwardly against the turret flange 27. The turret flange 27 is provided with inwardly facing cam depressions 33 arranged in equal angularly spaced relation about the axis of the turret 20 and into which the detent roller 29 selectively engages under the influence of the spring 31 to precisely releasably detain the turret 20 in positions in which a selected view finder lens is in view finding position registering with the view finder axis 22, it being noted that this spring and cam detent device serves also to actuate the turret 20 angularly a limited extent for registering each view finder lens in view finding position.

The relatively large diameter of the turret 6 accommodates the relatively large photographic lenses and the required relatively great spacing thereof and the relatively small diameter of the turret 20 accommodates the relatively small view finder lenses and the required relatively small spacing thereof, and as shown the diameter of the turret 6 is approximately twice that of the turret 20.

A spur gear 34 of relatively large diameter, preferably approximating the diameter of the turret 6, is formed on the flange 11 of the turret 6 and is thus angularly fixed with this turret, and a spur gear 35 of relatively small diameter, preferably approximating the diameter of the turret 20, is formed on the flange 27 of the turret 20 and is thus angularly fixed with this turret. A spur gear idler gear 36, preferably of a relatively small diameter, is rotatably mounted, as designated at 37 on the spacing block 23, and meshes with both of the gears 34 and 35 when the camera door is secured in its said position on the camera casing 1. The gear 36 being carried with the camera door, engagement and disengagement of the gears 34 and 36 permits removal of the door from and mounting of the same on the camera casing.

When the camera door 4 is secured in its said position on the camera casing 1 as shown, the gears 34, 35 and 36 form a constant drive connection between the turrets 6 and 20, so that rotation of either turret rotates the other. As shown, the diameters of the gears 34 and 35 have a ratio of two to one, so that the angular movement of the turret 20 is twice that of the turret 6.

The photographic and view finder lenses are arranged in corresponding sequences arranged correspondingly and reversely with respect to concomitant rotation of their respective turrets, that is to say, assuming the rotation of the turrets 6 and 20 in Figure 1 to be clockwise in Figure 1, the sequence of the view finder lenses 24, 25 and 26 is arranged clockwise or correspondingly with respect to clockwise rotation of the view finder lens turret 20, and the corresponding sequence of the photographic lenses 8, 9 and 10 is arranged counter clockwise or reversely with respect to clockwise rotation of the photographic lens turret 6.

Consequently, assuming the photographic and view finder lens turrets to be properly timed, a selected photographic lens and its corresponding view finder lens are simultaneously positioned in their functioning positions by manipulation of either turret. As an example, assuming as shown in Figure 1, that the photographic lens 8 and its corresponding view finder lens 24 are in their functioning positions and it is desired to place the photographic lens 9 and its corresponding view finder lens 25 in their functioning positions, with clockwise movement of the turrets the turret 6 is moved one lens space and the turret 20 is moved two lens spaces to simultaneously place the corresponding lenses 9 and 25 in their functioning positions, and with counter clockwise movements of the turrets the turret 6 is moved two lens spaces and the turret 20 is moved four lens spaces to simultaneously place the corresponding lenses 9 and 25 in their functioning positions, in the latter case the lens 25 passing its functioning position once before the corresponding lenses 9 and 25 are simultaneously placed in their functioning positions. Thus, though angular movement of the view finder lens turret is greater than that of the photographic lens turret, the photographic and corresponding view finder lenses are selectively simultaneously placed in their functioning positions.

Observing that as shown, the number of lenses on each turret is three and that the angular movement of the view finder lens turret is twice that of the photographic lens turret, it is to be noted that the invention involves angular movement of the view finder lens turret greater than that of the photographic lens turret by a multiple such that of this multiple and the number of lenses on one turret one is an odd and the other is an even number, the multiple preferably differing by one from the number of lenses on one turret. Thus, in the case of turrets each carrying an even number of lenses, say four, the multiple by which the angular movement of the view finder lens turret is greater than that of the photographic lens turret is an odd number, say three.

The mesh of the gears 34, 35 and 36 preferably provides a limited amount of angular play between the turrets 6 and 20 as will be observed in Figure 1, and the hereinbefore described spring and cam detent devices which are respectively connected with the turrets, are adapted to independently angularly actuate the turrets within the limits of said angular play for simultaneously registering each photographic lens and its corresponding view finder lens respectively in photographing and view finding positions, thus providing precise positioning of the photographic and view finder lenses in their functioning positions without requiring a precision drive connection between the lens turrets.

The inclusion of the intermediate idler gear 36 in the drive connection between the lens turrets provides for placing the view finder at different distances from the optical axis of the camera with only minor alteration of the turret drive connection as it is only necessary to alter the position of the rotatable mounting 37 of this gear to properly mesh the idler gear with the gears 34 and 35, and where as shown the idler gear is rotatably mounted on the interchangeable spacing block 23, each different spacing block may have the rotatable mounting of the idler gear predeterminately individually positioned thereon in correspondence with the spacing dimension of the spacing block with obvious advantage.

While I have thus described my invention, I do not wish to be limited to the precise details described, as changes may be readily made without departing from the spirit of my invention, but having thus described my invention, I claim as new and desire to secure by Letters Patent the following:

1. In a photographic camera, the combination of laterally adjacent rotatably mounted photographic and view finder lens turrets respectively of large and small diameters, equal pluralities of different respectively corresponding photographic and view finder lenses respectively mounted on said photographic and view finder lens turrets in corresponding angularly spaced relation about the axes of said turrets, a constant drive connection between said turrets adapted to effect angular movement of said view finder lens turret greater than that of said photographic lens turret by a multiple such that of said multiple and the number of lenses on one of said turrets one is an even and the other is an odd number and comprising transmission members respectively of large and small diameters respectively angularly fixed with said photographic and view finder lens turrets, and said photographic and view finder lenses being arranged in corresponding sequences respectively arranged correspondingly and reversely with respect to concomitant rotation of their respective turrets due to said drive connection.

2. In a photographic camera, the combination of claim 1 and further comprising, said drive connection providing a limited amount of angular play between said turrets, and releasable spring and cam detent devices respectively connected with said turrets and adapted to independently angularly actuate the same within the limits of said angular play for simultaneously registering each photographic lens and its corresponding view finder lens respectively in photographing and view finding positions.

3. In a photographic camera, the combination of laterally adjacent rotatably mounted photographic and view finder lens turrets respectively of large and small diameters, equal pluralities of different respectively corresponding photographic and view finder lenses respectively mounted on said photographic and view finder lens turrets in corresponding angularly spaced relation about the axes of said turrets, a constant spur gear drive connection between said turrets adapted to effect angular movement of said view finder lens turret greater than that of said photographic lens turret by a multiple such that of said multiple and the number of lenses on one of said turrets one is an even number and the other is an odd number and comprising spur gears of large and small diameters respectively angularly fixed with said photographic and view finder lens turrets and a rotatably mounted idler spur gear meshing with said gears, and said photographic and view finder lenses being arranged in corresponding sequences respectively arranged correspondingly and reversely with respect to concomitant rotation of their respective turrets due to said drive connection.

4. In a photographic camera, the combination of laterally adjacent rotatably mounted photographic and view finder lens turrets respectively of large and small diameters, equal pluralities of different respectively corresponding photographic and view finder lenses respectively mounted on said photographic and view finder lens turrets in corresponding angularly spaced relation about the axes of said turrets, a constant drive connection between said turrets adapted to effect angular movement of said view finder lens turret greater than that of said photographic lens turret by a multiple which differs by one from the number of lenses on one of said turrets and comprising transmission members of large and small diameters respectively approximating the diameters of and respectively angularly fixed with said photographic and view finder lens turrets, and said photographic and view finder lenses being arranged in corresponding sequences respectively arranged correspondingly and reversely with respect to concomitant rotation of their respective turrets due to said drive connection.

5. In a photographic camera, the combination of laterally adjacent rotatably mounted photographic and view finder lens turrets respectively of large and small diameters having a ratio of approximately two to one, three different respectively corresponding photographic and view finder lenses respectively mounted on said photographic and view finder lens turrets in corresponding angularly spaced relation about the axes of said turrets, a spur gear constant drive connection between said turrets adapted to effect angular movement of said view finder lens turret twice that of said photographic lens turret and comprising spur gears of large and small diameters having a ratio of two to one and respectively approximating the diameters of and respectively angularly fixed with said photographic and view finder lens turrets, and said photographic and view finder lenses being arranged in corresponding sequences respectively arranged correspondingly and reversely with respect to concomitant rotation of their respective turrets due to said drive connection.

6. In a photographic camera, the combination of a camera casing provided with an access opening at one side thereof, a door releasably secured on said casing in position closing said opening, a photographic lens turret rotatably mounted forwardly on said casing, a view finder carried on said door and comprising a forwardly disposed rotatably mounted view finder lens turret of a diameter smaller than that of said photographic lens turret and disposed laterally adjacent said photographic lens turret when said door is secured in said position, equal pluralities of different respectively corresponding photographic and view finder lenses respectively mounted on said photographic and view finder lens turrets in corresponding angularly spaced relation about the axes of said turrets, a spur gear constant drive connection between said turrets adapted to effect angular movement of said view finder lens turret greater than that of said photographic lens turret by a multiple such that of said multiple and the number of lenses on one of said turrets one is an even and the other is an odd number and comprising spur gears of large and small diameters respectively angularly fixed with said photographic and view finder lens turrets, and said photographic and view finder lenses being arranged in corresponding sequences respectively arranged correspondingly and reversely with respect to concomitant rotation of their respective turrets due to said drive connection.

7. In a photographic camera, the combination of claim 6 and further comprising, the diameters of said spur gears respectively approximating the diameters of said turrets, and said drive connection further comprising a rotatable spur idler gear carried on said door and meshing with both of said spur gears when said door is in said position.

8. In a photographic camera, the combination of claim 6 and further comprising, said drive connection providing a limited amount of angular play between said turrets, and releasable spring and cam detent devices respectively connected with said turrets and adapted to independently angularly actuate the same within the limits of said angular play for simultaneously registering each photographic lens and its corresponding view finder lens respectively in photographing and view finding positions.

9. In a photographic camera, the combination of a camera casing provided with an access opening at one side thereof, a door releasably secured on said casing in position closing said opening, a photographic lens turret rotatably mounted forwardly on said casing, a view finder comprising a forwardly disposed rotatably mounted view finder lens turret of a diameter smaller than that of said photographic lens turret, a mounting carrying said view finder on the exterior of said door with said view finder lens turret disposed laterally adjacent said photographic lens turret when said door is secured in said position and comprising an interchangeable spacing block laterally interposed between said view finder and door, equal pluralities of different respectively corresponding photographic and view finder lenses respectively mounted on said photographic and view finder lens turrets in corresponding angularly spaced relation about the axes of said turrets, a spur gear constant drive connection between said turrets adapted to effect angular movement of said view finder lens turret greater than that of said photographic lens turret by a multiple such that of said multiple and the number of lenses on one of said turrets one is an even and the other is an odd number and comprising spur gears of large and small diameters respectively approximating the diameters of and respectively angularly fixed with said photographic and view finder lens turrets and an idler spur gear rotatably mounted on said spacing block and meshing with both of said spur gears when said door is in said position, and said photographic and view finder lenses being arranged in corresponding sequences respectively arranged correspondingly and reversely with respect to concomitant rotation of their respective turrets due to said drive connection.

10. In a photographic camera, the combination of a camera casing provided with an access opening at one side thereof, a door releasably secured on said casing in position closing said opening, a photographic lens turret rotatably mounted forwardly on said casing, a view finder comprising a forwardly disposed rotatably mounted view finder lens turret of a diameter approximately one-half of that of said photographic lens turret, a mounting carrying said view finder on the exterior of said door with said view finder lens turret disposed laterally adjacent said photographic lens turret when said door is secured in said position and comprising an interchangeable spacing block laterally interposed between said view finder and door, equal odd pluralities of different respectively corresponding photographic and view finder lenses respectively mounted on said photographic and view finder lens turrets in corresponding angularly spaced relation about the axes of said turrets, a spur gear constant drive connection between said turrets adapted to effect angular movement of said view finder lens turret twice that of said photographic lens turret and comprising spur gears of large and small diameters having a ratio of two to one and respectively approximating the diameters of and respectively angularly fixed with said photographic and view finder lens turrets and an idler gear of relatively small diameter and rotatably mounted on said spacing block and meshing with both of said spur gears when said door is in said position, and said photographic and view finder lenses being arranged in corresponding sequences respectively arranged correspondingly and reversely with respect to concomitant rotation of their respective turrets due to said drive connection.

11. In a photographic camera, the combination of claim 10 and further comprising, said drive connection providing a limited amount of angular play between said turrets, and releasable spring and cam detent devices respectively connected with said turrets and adapted to independently angularly actuate the same within the limits of said angular play for simultaneously registering each photographic lens and its corresponding view finder lens respectively in photographing and view finding positions.

ARTHUR C. MUELLER.

No references cited.